United States Patent
Dickson et al.

(10) Patent No.: US 7,416,174 B2
(45) Date of Patent: Aug. 26, 2008

(54) MOUNT ASSEMBLY

(75) Inventors: Daniel G. Dickson, West Bloomfield, MI (US); Wesley C. Fog, Walled Lake, MI (US); Neil J. Oberley, Monroeville, IN (US)

(73) Assignee: Cooper Standard Automotive, Novi, MI (US)

( * ) Notice: Subject to any disclaimer, the term of this patent is extended or adjusted under 35 U.S.C. 154(b) by 307 days.

(21) Appl. No.: 11/127,481

(22) Filed: May 12, 2005

(65) Prior Publication Data

US 2006/0255516 A1 Nov. 16, 2006

(51) Int. Cl.
*F16F 7/00* (2006.01)

(52) U.S. Cl. .................. 267/141.1; 267/141.4

(58) Field of Classification Search .......... 267/141, 267/141.1, 141.2, 141.4, 153, 140.5, 292; 248/560, 566, 569, 573, 636
See application file for complete search history.

(56) References Cited

U.S. PATENT DOCUMENTS

| | | | |
|---|---|---|---|
| 4,286,777 A | 9/1981 | Brown | 267/63 R |
| 4,478,396 A | 10/1984 | Kawaura | |
| 4,895,115 A | 1/1990 | Weber et al. | 123/195 |
| 5,743,509 A | 4/1998 | Kanda et al. | 248/635 |
| 5,799,930 A | 9/1998 | Willett | 267/141.4 |
| 6,361,096 B2 | 3/2002 | Kim | 296/35.1 |
| 6,364,296 B1 | 4/2002 | Cummings et al. | 267/141.4 |
| 7,070,157 B2 * | 7/2006 | Huprikar et al. | 248/636 |
| 2005/0073166 A1 | 4/2005 | Snyder | |
| 2006/0202515 A1 * | 9/2006 | Dickson et al. | 296/190.07 |

* cited by examiner

*Primary Examiner*—Pam Rodriguez

(57) ABSTRACT

A mount assembly having a first carrier and a second carrier with each of the carriers being coupled to a frame of a vehicle. A first insulator abuts the first carrier and a second insulator abuts the second carrier for isolating movement of the frame relative to the vehicle body in a first direction. The first insulator is formed of microcellular polyurethane having a non-linear modulus of elasticity. An intermediate insulator is also mounted to the frame of the vehicle. The intermediate insulator is formed of rubber having a substantially linear modulus of elasticity. The intermediate insulator may include a structural insert encapsulated by the rubber. The intermediate insulator further isolates the movement of the frame relative to the vehicle body in the first direction to provide two different rates of elasticity. The intermediate insulator also isolates movement of the frame relative to the vehicle body in a second direction transverse to the first direction.

20 Claims, 3 Drawing Sheets

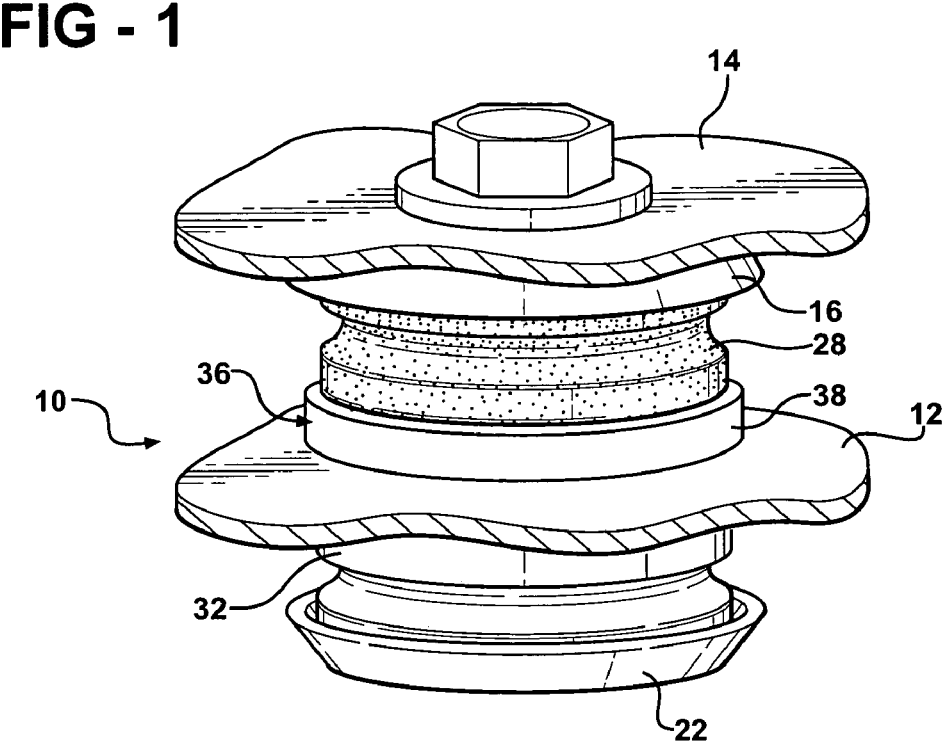
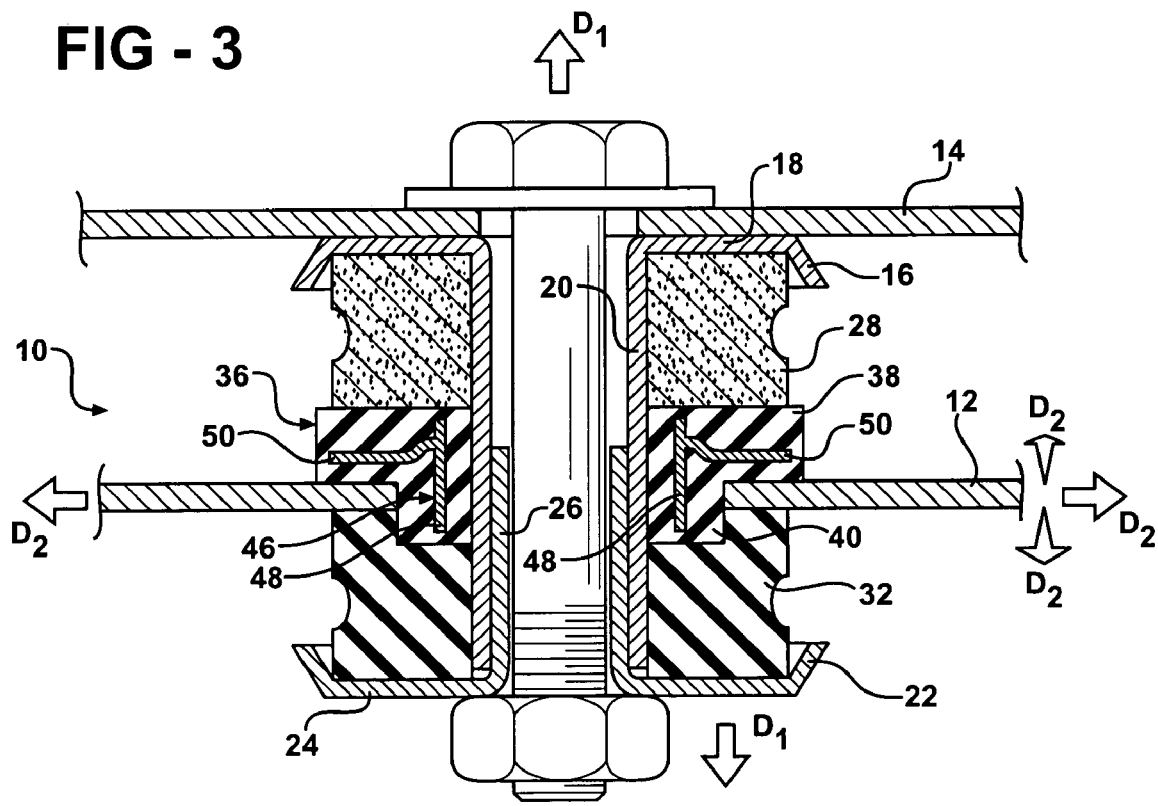

MOUNT ASSEMBLY

BACKGROUND OF THE INVENTION

1. Field of the Invention

The subject invention relates to a mount assembly for a vehicle wherein the mount assembly isolates various movements between a frame of the vehicle and a vehicle body

2. Description of Related Art

Mount assemblies for vehicles are well known in the art. Examples of such assemblies are shown in U.S. Pat. Nos. 5,799,930 and 6,361,096. Each of these assemblies include a steel carrier having one or more insulators. The carrier and insulators are mounted between a frame of a vehicle and a vehicle body in order to isolate movement between the frame and vehicle body. The insulators are typically formed of an elastomeric material such as rubber or microcellular polyurethane (MPU).

One important factor in the development of mount assemblies relates to the rate of elasticity, also known as a spring rate, of the insulators. The insulators can have a relatively soft spring rate, which is preferred for isolating vibrational motion. Vibrational motion is generally associated with lower amplitudes and higher frequencies, such as when a vehicle travels over typical vibrations of a road surface. It is desirable to have the insulators operate at lower or softer spring rate to allow for improved isolation and cushioning of the vibrations of the frame relative to the vehicle body.

On the other hand, the insulators can have relatively stiff or hard spring rates, which is preferred for isolating translational motion. Translational motion is typically associated with high amplitude, lower frequency impacts such as the occasional large impact when a vehicle passes over a pot hole. The impacts can define a maximum displacement of the frame relative to the vehicle body.

In order to achieve a desired cushioning performance, prior art insulators are at times formed of a material having a low modulus of elasticity, such as microcellular polyurethane (MPU). Although, these MPU insulators can provide the soft spring rate as well as some maximum displacement control, the total maximum displacement is still too large and the nature and location of the transition from soft to hard spring rate cannot be controlled independent of the properties of polymer. Thus these types of insulators are not easily tunable. Also, MPU insulators can have a relatively large height, which require large clearances between the carrier and the frame. This also creates an undesirable large displacement between the carrier and the frame during translational motion which equates to an undesirable large movement (maximum displacement) between the frame and the vehicle body.

In order to overcome some of the above disadvantages, the prior art has contemplated forming insulators of materials having different modulus of elasticity. These insulators are a compromise between softer spring rates, to isolate vibrations, and higher spring rates, to isolate impacts. For example, U.S. Pat. Nos. 4,286,777 and 6,419,215, disclose an insulator formed of two materials having different modulus of elasticity. The advantage of this type of insulator design relates to the tuneability or customization of the insulator for a particular application. However, the conventional insulators still have significant limitations and typically cannot be adequately customized or tuned. As such, there remains an opportunity to further develop the material and geometrical features of the mount assemblies to optimize the customization or tuneability of the insulators.

Another important factor in the development of mount assemblies relates to the isolation of lateral forces, i.e., sideways and fore/aft forces, of the frame relative to the vehicle body. The prior art solutions for isolating lateral forces typically include complicated and expensive orientations and geometry of the insulators. An example of one such design is disclosed in U.S. Pat. No. 5,743,509. Hence, there remains an opportunity to further develop the material and geometrical features of the insulators to adequately isolate lateral forces while simplifying the design.

Accordingly, it would be desirable to develop a mount assembly with one or more insulators that is of a reasonable height, takes advantage of a low or soft spring rate, has low maximum displacement, is easily tunable or customizable, and can adequately isolate lateral forces independently.

SUMMARY OF THE INVENTION AND ADVANTAGES

A mount assembly for use with a vehicle having a frame and a vehicle body. The mount assembly comprises a first carrier having a first flange. The first carrier is adapted to be coupled to the frame of the vehicle. A first insulator abuts the first flange of the first carrier for isolating movement of the frame relative to the vehicle body in a first direction. The first insulator is formed of microcellular polyurethane having a non-linear modulus of elasticity. A second carrier has a second flange and is also adapted to be coupled to the frame of the vehicle. A second insulator abuts the second flange of the second carrier for further isolating the movement of the frame relative to the vehicle body in the first direction. An intermediate insulator couples the first insulator to the second insulator and is adapted to be mounted to the frame of the vehicle. The intermediate insulator is formed of rubber having a substantially linear modulus of elasticity for isolating the movement of the frame relative to the vehicle body in the first direction and for isolating movement of the frame relative to the vehicle body in a second direction transverse to the first direction. The mount assembly can provide two different rates of elasticity during isolation of the movement in the first direction and can also isolate the movement of the frame relative to the vehicle body in a second direction transverse to the first direction.

Accordingly, the mount assembly of the subject invention, through material improvements, is formed of different materials having different modulus of elasticity, i.e. linear vs. non-linear. This improved mount assembly is therefore of a reasonable height, takes advantage of a soft spring rate for isolating low amplitude vibrations, can also adequately isolate significant impacts, which equates to low maximum displacement, and can adequately isolate lateral forces independently. The improved mount assembly is also easily tunable or customizable. As described in more detail below, the intermediate insulator of the subject invention also includes various geometrical improvements.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a mount assembly in accordance with the subject invention;

FIG. 3 is a cross-sectional view of the mount assembly of FIG. 1;

DETAILED DESCRIPTION OF THE INVENTION

Figure 2:
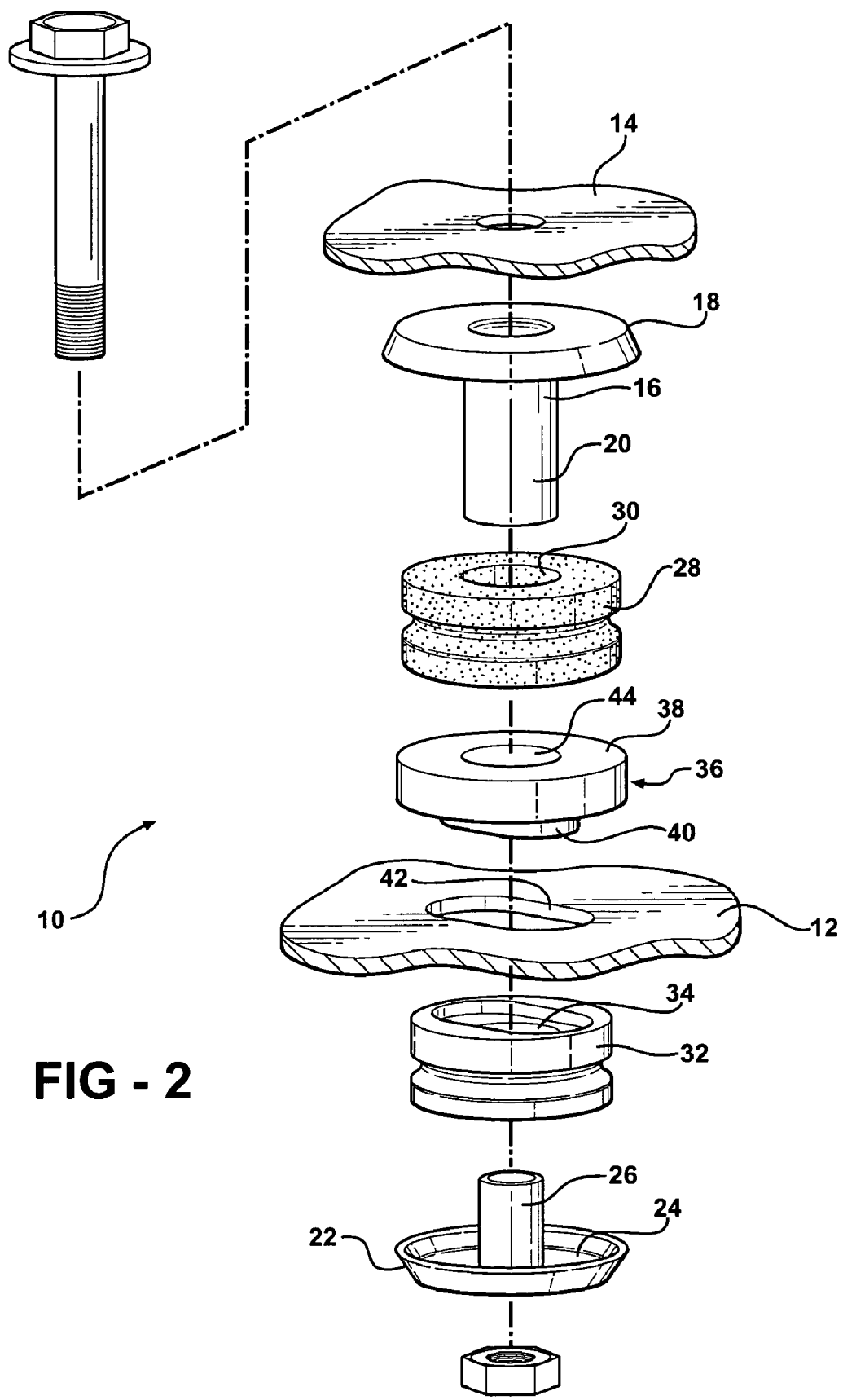
FIG. 2 is an exploded perspective view of the mount assembly of FIG. 1.

Referring to the Figures, wherein like numerals indicate like or corresponding parts throughout the several views, a mount assembly in accordance with the subject invention is generally shown at 10 in FIGS. 1-3. The mount assembly 10 is preferably designed for use with a vehicle having a frame 12. In the preferred embodiment, the mount assembly 10 is designed as a body mount, which is typically disposed between the frame 12 of the vehicle and a vehicle body 14. It is contemplated, however, that the mount assembly 10 of the subject invention is equally applicable to automotive suspension systems and other like applications.

The mount assembly 10 includes a first carrier 16 having a first flange 18. The first carrier 16 is adapted to be coupled to the frame 12 of the vehicle through a number of insulators as will be discussed in greater detail below. The first flange 18 of the first carrier 16 can include an angled outer periphery to define a cup shaped first carrier 16. The first carrier 16 includes a central tubular member 20 extending from the first flange 18. The mount assembly 10 also includes a second carrier 22 having a second flange 24. The second flange 24 of the second carrier 22 could similarly include an angled outer periphery to define a cup shaped second carrier 22. The second carrier 22 is similarly adapted to be coupled to the frame 12 of the vehicle through the insulators. The second carrier 22 also includes a central tubular member 26 extending from the second flange 24 such that the second carrier 22 is substantially similar to the first carrier 16. The central tubular members 20, 26 may be of unequal length, such as shown, or may be substantially equivalent in length. The tubular members 20, 26 are designed to interconnect the first 16 and second 22 carriers. In particular, the tubular members 20, 26 encapsulate each other to interconnect the first carrier 16 to the second carrier 22. Preferably, the first 16 and second 22 carriers are formed of a rigid metal material such as steel.

The mount assembly 10 further includes a first insulator 28 abutting the first flange 18 of the first carrier 16. The first insulator 28 isolates movement of the frame 12 relative to the vehicle body 14 in a first direction. The first direction is indicated with arrows $D_1$, in FIG. 3, and is typically the vertical direction. It should be appreciated that the first direction $D_1$ may be any suitable direction depending upon the mounting location of the mount assembly 10. The first insulator 28 is formed of microcellular polyurethane having a non-linear modulus of elasticity. The first insulator 28 is preferably of a donut shaped configuration and defines an opening 30 passing therethrough. It should be appreciated that the first insulator 28 could be of any suitable configuration.

Figure 4:
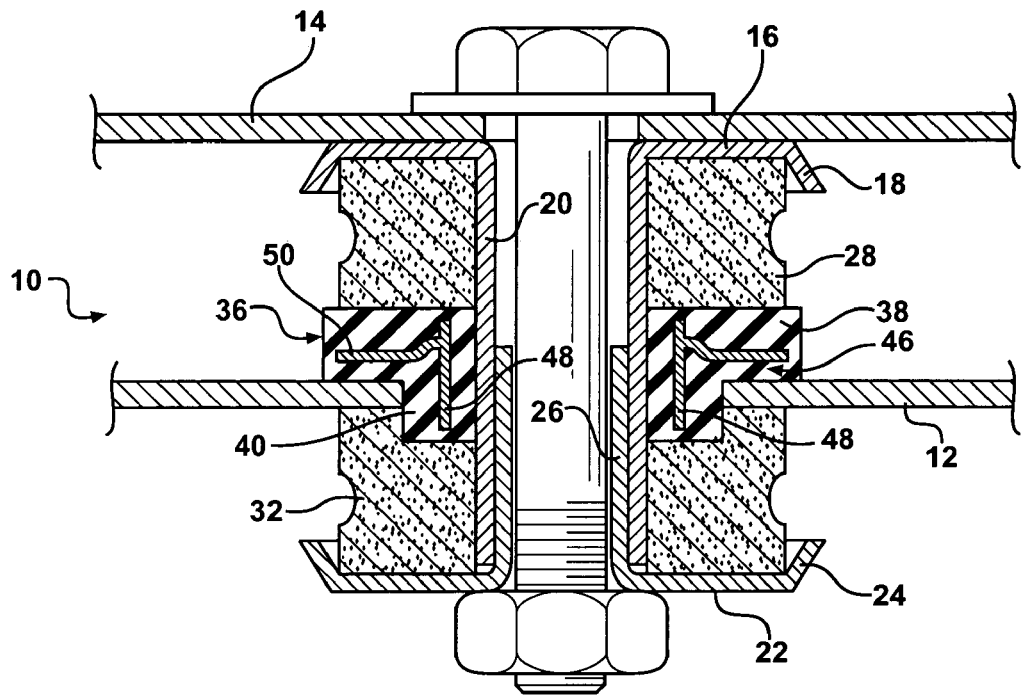
FIG. 4 is a cross-sectional view of an alternative mount assembly.

The mount assembly 10 also includes a second insulator 32 abutting the second flange 24 of the second carrier 22. The second insulator 32 further isolates the movement of the frame 12 relative to the vehicle body 14 in the first direction. In the preferred embodiment of FIGS. 1-3, the second insulator 32 is formed of rubber having a linear modulus of elasticity. Alternatively, such as shown in FIG. 4, the second insulator 32 can be formed of microcellular polyurethane having a non-linear modulus of elasticity. It should be appreciated that the second insulator 32 may be formed of any suitable material. The second insulator 32 also defines an opening 34 passing therethrough which is aligned with the opening 30 in the first insulator 28 when the first 28 and second 32 insulators abut the first 16 and second 22 carriers. As should be appreciated, it is only necessary that the openings 30, 34 generally align, i.e. have a common center point. The second insulator 32 is also illustrated as having a donut shaped configuration but could have any suitable configuration without deviating from the scope of the subject invention.

The mount assembly 10 further includes an intermediate insulator 36 coupling the first insulator 28 to the second insulator 32. In particular, the intermediate insulator 36 abuts both the first 28 and second 32 insulators. The intermediate insulator 36 is also adapted to be mounted to the frame 12 of the vehicle. In the preferred embodiment of FIGS. 1-3, the intermediate insulator 36 includes a body portion 38 and an extremity 40 extending from the body portion 38. The body portion 38 abuts a surface of the frame 12 and the extremity 40 extends into an aperture 42 in the frame 12 between one of the tubular members 20, 26 and the frame 12. As such, the intermediate insulator 36 is mounted directly to the frame 12 and one of the tubular members 20, 26. The extremity 40 also passes through the aperture 42 to extend into the second insulator 32. In the most preferred embodiment, the body portion 38 abuts the first insulator 28 and the extremity 40 rests within a recess of the second insulator 32. The intermediate insulator 36 also defines an opening 44 extending through the body portion 38 and the extremity 40. The opening 44 of the intermediate insulator 36 aligns with the openings 30, 34 of the first 28 and second 32 insulators when the first 28 and second 32 insulators are coupled to the intermediate insulator 36. In the preferred embodiment, the central tubular members 20, 26 of the first 16 and second 22 carriers pass through the openings 30, 34, 44 in the first 28, second 32, and intermediate 36 insulators. The first 28, second 32, and intermediate 36 insulators are shown to abut the central tubular members 20, 26. It should be appreciated that the openings 30, 34, and 44 could be enlarged such that the first 28, second 32, and intermediate 36 insulators do not continuously abut the central tubular members 20, 26.

The intermediate insulator 36 is formed of rubber having a substantially linear modulus of elasticity. Rubber is defined as any suitable type of natural or synthetic high polymer having particular properties of deformation and elastic recovery after vulcanization with sulfur or other cross-linking agent. Synthetic rubber is any group of manufactured elastomers that approximate one or more of the properties of natural rubber and require vulcanization.

The intermediate insulator 36 is designed to further isolate the movement of the frame 12 relative to the vehicle body 14 in the first direction $D_1$ such that the mount assembly 10 can provide two different rates of elasticity during isolation of the movement in the first direction. The two different rates of elasticity are defined by the first insulator 28 formed of microcellular polyurethane and the intermediate insulator 36 formed of rubber. As discussed above, the first direction is illustrated by arrow $D_1$ and is typically in the vertical direction. The microcellular polyurethane first insulator 28 has a relatively soft spring rate that is non-linear, which is well suited for isolating low amplitude, high frequency vibrations. As known to those skilled in the art, these types of vibrations can be found, for example, when a vehicle travels over typical undulations in a road surface. The rubber intermediate insulator 36 has a relatively stiffer spring rate that is linear, which is well suited for isolating high amplitude, lower frequency impacts. Again, as known to those skilled in the art, these types of impacts can present significant translational motion for the frame 12 relative to the vehicle body 14 and can be associated, for example, with the occasional large impact that occurs when a vehicle passes over a pothole. As such, at least one of the first 28 and second 32 insulators initially isolates the movement in the first direction $D_1$ and then upon additional movement in the first direction $D_1$ at least one of the first 28 and second 32 insulators along with the intermediate insulator 38 simultaneously isolate the additional movement.

The intermediate insulator 36 also isolates movement of the frame 12 relative to the vehicle body 14 in a second direction transverse to the first direction. The second transverse direction is illustrated as arrows $D_2$ in FIG. 3, which is typically lateral and/or fore and aft to the mount assembly 10. In other words, the second direction $D_2$ is virtually any direction that is opposed to the first direction $D_1$. As such, the intermediate insulator 36 can also isolate transverse forces of the frame 12 relative to the vehicle body 14. The isolation of the transverse forces is primarily accomplished through the extremity 40 extending through the aperture 42 in the frame 12. It should be appreciated that the intermediate insulator 36 may be of any suitable dimension for coupling to any suitably configured frame.

As best shown in FIG. 3, the intermediate insulator 36 includes a structural insert 46 substantially encapsulated by the intermediate rubber insulator 36. The structural insert 46 further stiffens the intermediate insulator 36 such that the intermediate insulator 36 can adequately isolate the impacts and the transverse forces. Preferably, the structural insert 46 includes a first portion 50 orientated transverse to the first direction $D_1$ for further isolating movement of the frame 12 relative to the vehicle body 14 in the first direction $D_1$, i.e., for isolating the impacts. The first portion 50 of the structural insert 46 is therefore orientated perpendicular to the tubular members 20, 26. The structural insert 46 preferably includes a second portion 48 orientated transverse to the second direction $D_2$ for further isolating movement of the frame 12 relative to the vehicle body 14 in the second direction $D_2$, i.e., for isolating the transverse forces. The second portion 48 of the structural insert 46 is therefore orientated parallel with the tubular members 20, 26.

In the most preferred embodiment, the first portion 50 of the structural insert 46 is encapsulated within the body portion 48 and the second portion 48 of the structural insert 46 is at least partially encapsulated within the extremity 40. Further, the structural insert 46 is formed of metal encapsulated by the intermediate rubber insulator 36. Specifically, the preferred embodiment defines the structural metal insert 46 as being formed of steel.

During operation, the frame 12 can move relative to the vehicle body 14 through the first 28 and/or second 32 insulators and then through the intermediate insulator 36. Depending upon the direction of the vibration or impact being applied to the mount assembly 10, one of the first 28 and second 32 insulators will compress and the opposing first 28 and second 32 insulator will expand to an equal degree. As known to those skilled in the art, the mount assembly 10 as shown in FIGS. 1 and 3 is illustrated in a partially compressed condition. As such, the first 28 and second 32 insulators can expand and can remain in continuous contact with the associated first 16 and second 22 carrier. If vibrations are being transmitted through the mount assembly 10, then the first 28 and/or second 32 insulators will isolate the majority of these forces. However, if an impact is transmitted through the mount assembly 10, then one of the first 28 and second 32 insulators will further compress and the forces from the impact will also be isolated by the intermediate insulator 36.

Figure 5:
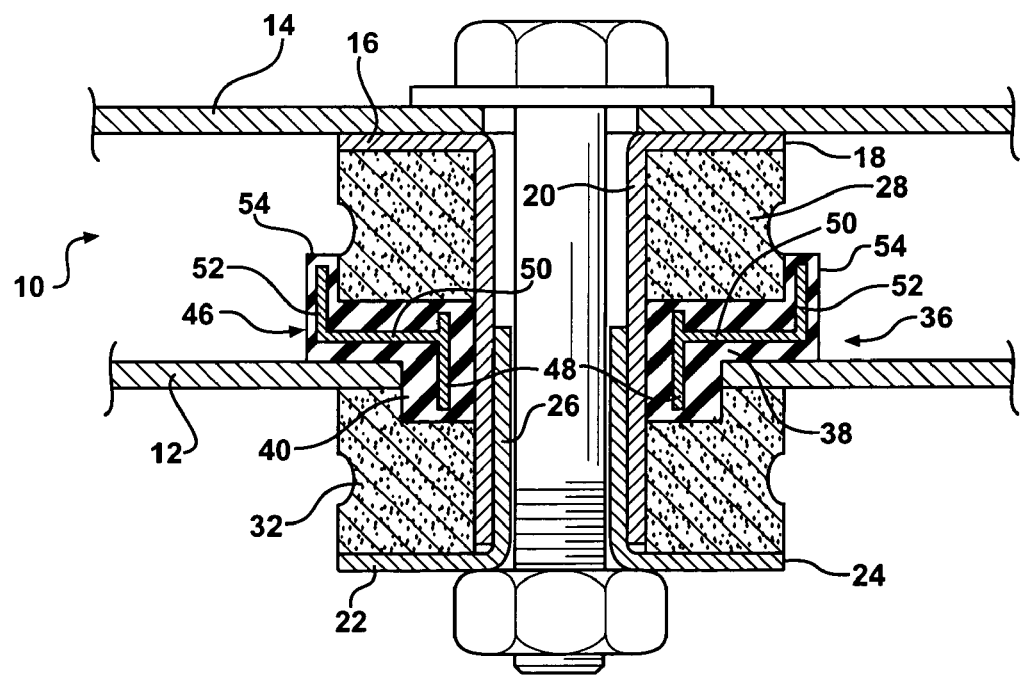
FIG. 5 is a cross-sectional view of another alternative mount assembly.

Referring to FIG. 5, a further alternative of the mount assembly 10 is shown wherein the second insulator 32 is formed of microcellular polyurethane having non-linear modulus of elasticity. This embodiment illustrates the flanges 18, 24 of the carriers 16, 22 without the angled outer peripheries. This configuration of the carriers 16, 22 could be used throughout any of the embodiments. Also, in this embodiment, the intermediate insulator 36 has a number of alternative features and configurations. Specifically, the structural insert 46 further includes a third portion 52 orientated transverse to the second direction $D_2$ and substantially parallel with the second portion 48 of the insert 46 for further isolating movement of the frame 12 relative to the vehicle body 14 in the second direction $D_2$. The structural insert 46 of this embodiment is also designed to limit movement of the frame 12 relative to the vehicle body 14 in the first direction $D_1$. Also, the extremity 40 discussed above is further defined as a first extremity 40 and the intermediate insulator 36 further includes a second extremity 54 extending from the body portion 38 in a direction opposite from the first extremity 40. The first portion 50 of the structural insert 46 is preferably encapsulated within the body portion 38, the second portion 48 of the structural insert 46 is preferably encapsulated within the first extremity 40, and the third portion 52 of the structural insert 46 is preferably encapsulated within the second extremity 54. It should be appreciated that the intermediate insulator 36 may be of any suitable design or configuration for isolating various forces in a variety of directions.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A mount assembly for use with a vehicle having a frame and a vehicle body, said mount assembly comprising:

a first carrier having a first flange and adapted to be coupled to the frame of the vehicle;

a first insulator abutting said first flange of said first carrier for isolating movement of the frame relative to the vehicle body in a first direction, said first insulator formed of microcellular polyurethane having a non-linear modulus of elasticity;

a second carrier having a second flange and adapted to be coupled to the frame of the vehicle; and a second insulator abutting said second flange of said second carrier for further isolating said movement of the frame relative to the vehicle body in said first direction; and an intermediate insulator coupling said first insulator to said second insulator and adapted to be mounted to the frame of the vehicle, said intermediate insulator formed of rubber having a substantially linear modulus of elasticity for isolating said movement of the frame relative to the vehicle body in said first direction and for isolating movement of the frame relative to the vehicle body in a second direction transverse to said first direction wherein said mount assembly can provide two different rates of elasticity during isolation of said movement in said first direction and can also isolate said movement of the frame relative to the vehicle body in said second direction transverse to said first direction.

2. An assembly as set forth in claim 1 wherein at least one of said first and second insulators initially isolates said movement in said first direction and then upon additional movement in said first direction at least one of said first and second insulators and said intermediate insulator simultaneously isolate said additional movement.

3. An assembly as set forth in claim 1 further including a structural insert substantially encapsulated by said intermediate insulator for further isolating movement of the frame relative to the vehicle body in said first and second directions.

4. An assembly as set forth in claim 3 wherein said structural insert includes a first portion orientated transverse to said first direction for further isolating movement of the frame relative to the vehicle body in said first direction.

5. An assembly as set forth in claim 4 wherein said structural insert includes a second portion orientated transverse to said second direction for further isolating movement of the frame relative to the vehicle body in said second direction.

6. An assembly as set forth in claim 5 wherein said intermediate insulator includes a body portion and an extremity extending from said body portion.

7. An assembly as set forth in claim 6 wherein said first portion of said structural insert is encapsulated within said body portion and said second portion, of said structural insert is at least partially encapsulated within said extremity.

8. An assembly as set forth in claim 7 wherein said structural insert is formed of metal encapsulated within said intermediate rubber insulator.

9. An assembly as set forth in claim 6 wherein said structural insert further includes a third portion orientated transverse to said second direction and substantially parallel with said second portion of said insert for further isolating movement of the frame relative to the vehicle body in said second direction.

10. An assembly as set forth in claim 9 wherein said extremity is further defined as a first extremity and wherein said intermediate insulator further includes a second extremity extending from said body portion in a direction opposite from said first extremity.

11. An assembly as set forth in claim 10 wherein said first portion of said structural insert is encapsulated within said body portion, said second portion of said structural insert is encapsulated within said first extremity, and said third portion of said structural insert is encapsulated within said second extremity.

12. An assembly as set forth in claim 1 wherein said intermediate insulator includes a body portion and an extremity extending from said body portion.

13. An assembly as set forth in claim 12 wherein said intermediate insulator defines an opening extending through said body portion and said extremity.

14. An assembly as set forth in claim 13 wherein said first and second insulators each define corresponding openings aligned with said opening of said intermediate insulator when said first and second insulators are coupled to said intermediate insulator.

15. An assembly as set forth in claim 14 wherein each of said first and second carriers include a central tubular member extending from said first and second flanges with said tubular members encapsulating each other to interconnect said first carrier to said second carrier.

16. An assembly as set forth in claim 15 wherein said central tubular members of said first and second carriers pass through said openings in said first, second, and intermediate insulators.

17. An assembly as set forth in claim 16 further including a structural insert having a first portion orientated perpendicular to said tubular members for further isolating movement of the frame relative to the vehicle body in said first direction and said structural insert includes a second portion orientated parallel with said tubular members for further isolating movement of the frame relative to the vehicle body in said second direction.

18. An assembly as set forth in claim 1 wherein said second insulator is formed of rubber having a linear modulus of elasticity.

19. An assembly as set forth in claim 1 wherein said second insulator is formed of microcellular polyurethane having a non-linear modulus of elasticity.

20. An assembly as set forth in claim 1 wherein said first flange of said first carrier includes an angled outer periphery to define a cup shaped first carrier and said second flange of said second carrier includes an angled outer periphery to define a cup shaped second carrier.

\* \* \* \* \*